(12) United States Patent
Chen et al.

(10) Patent No.: US 12,253,926 B2
(45) Date of Patent: Mar. 18, 2025

(54) SIMULATOR APPLICATION ON MOBILE DEVICE FOR INTEGRATION TESTING

(71) Applicant: Visa International Service Association, San Francisco, CA (US)

(72) Inventors: Yuexi Chen, Foster City, CA (US); Marc Kekicheff, Foster City, CA (US); Christian Aabye, Redwood City, CA (US); Alexandre Pierre, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/720,095

(22) PCT Filed: Dec. 17, 2021

(86) PCT No.: PCT/US2021/064176
§ 371 (c)(1),
(2) Date: Jun. 14, 2024

(87) PCT Pub. No.: WO2023/113828
PCT Pub. Date: Jun. 22, 2023

(65) Prior Publication Data
US 2024/0419567 A1   Dec. 19, 2024

(51) Int. Cl.
*G06F 11/00* (2006.01)
*G06F 11/26* (2006.01)
(Continued)

(52) U.S. Cl.
CPC .......... *G06F 11/263* (2013.01); *G06F 11/261* (2013.01); *G06F 11/2635* (2013.01);
(Continued)

(58) Field of Classification Search
CPC .. G06F 11/263; G06F 11/261; G06F 11/2635; G06F 11/3684; G06F 11/3696; H04W 12/47; H04L 43/55
See application file for complete search history.

(56) References Cited

U.S. PATENT DOCUMENTS

| | | | |
|---|---|---|---|
| 11,099,835 B1* | 8/2021 | Wall | G06F 8/61 |
| 2010/0070255 A1* | 3/2010 | Biltz | G06F 11/261 |
| | | | 702/182 |

(Continued)

FOREIGN PATENT DOCUMENTS

| | | |
|---|---|---|
| CN | 106686614 A | 5/2017 |
| KR | 20160118190 A | 10/2016 |

OTHER PUBLICATIONS

Savvi Test Platform, 2020, fime.com (Year: 2020).*
(Continued)

*Primary Examiner* — Marc Duncan
(74) *Attorney, Agent, or Firm* — Kilpatrick Townsend & Stockton LLP

(57) ABSTRACT

Methods and systems for performing efficient integration tests on mobile device for contactless data transfers are described. Rather than performing contactless communications with a variety of test user devices (e.g., test smart cards), which may be time consuming and may present physical difficulty, a mobile device can simulate the result of these communications using a simulator application operating on the mobile device. A contactless communication application, also operating on the mobile device, can communicate with the simulator application in order to generate interaction payloads based on stored data records corresponding to the test user devices. These interaction payloads can then be transmitted by the mobile device to a processing computer. Later, the mobile device may receive a response from the processing computer or another computer system, (Continued)

indicating if the interaction payloads were successfully received and interpreted. This in turn may indicate if the integration test was successful.

20 Claims, 6 Drawing Sheets

(51) Int. Cl.
*G06F 11/263* (2006.01)
*G06F 11/34* (2006.01)
*G06F 11/36* (2006.01)
*G06F 21/35* (2013.01)
*G06K 7/00* (2006.01)

(52) U.S. Cl.
CPC .............. *G06F 11/34* (2013.01); *G06F 11/36* (2013.01); *G06F 21/35* (2013.01); *G06K 7/0095* (2013.01)

(56) References Cited

U.S. PATENT DOCUMENTS

| | | |
|---|---|---|
| 2013/0098984 A1 | 4/2013 | Shenker et al. |
| 2014/0282425 A1 | 9/2014 | Zhao et al. |
| 2015/0113511 A1 | 4/2015 | Poulin |
| 2015/0318935 A1 | 11/2015 | Hudson et al. |
| 2017/0168920 A1 | 6/2017 | Werth et al. |
| 2018/0034753 A1 | 2/2018 | Willshire |
| 2019/0347189 A1* | 11/2019 | Chen .................... G06Q 20/341 |
| 2021/0019721 A1 | 1/2021 | Walters et al. |
| 2021/0067316 A1 | 3/2021 | Bellenger et al. |

OTHER PUBLICATIONS

PCT/US2021/064176 , "International Search Report and Written Opinion", Aug. 24, 2022, 8 pages.

EP21968367.9 , "Extended European Search Report", Jan. 8, 2025, 13 pages.

* cited by examiner

```
Package com.processing.contactless;

//**
 * Pseudocode for L3 Simulator application
 */

Public class Kernel { static int iIndexofTestUserDevice = 1;   ← 302

/**
    * Exposed method for contactless acceptance application to call for L3 Simulation API
    * Can replace a Contactless Kernel
    * Perform L3 Test contactless interaction
    * @return InteractionData with encrypted payload of L3 Test User Devices, if all tests are done
    then null
    */
    public InteractionData DoContactlessInteraction() {
                                                              304
        if (iIndexOfTestUserDevice > CONST_LAST_USER_DEVICE_INDEX) {
            return null; //All user devices' data has been returned    306
        } byte [] baUserDeviceDataReceived = GetUserDeviceDataFromResourceFile(iIndexOfTestUserDevice);
//Get L3 Test User Device Data from Resource File by index 308 → iIndexofTestCard ++;    //Next call from Contactless Acceptance Application will return next
L3 Test User Device Data 310  ⎧ InteractionData thisInteraction = new InteractionData();      //Create InteractionData object
             ⎩ thisInteraction.setInteractionPayload(baUserDeviceDataReceived);  //Set and encrypt payload 312 → return thisInteraction; //Return to Contactless Acceptance Application
    }
}
```

FIG. 3

```
package com.processing.contactless;

/**
 * Class to construct the EMV interaction data for online authorization
 */
public class InteractionData {
    public byte [] baEncryptedPayload;   //Encrypted EMV interaction data /**
     * Parses user device responses and encrypt the payload
     * @param UserDeviceApduRepose clear text user device apdu response including all EMV tags
     * @return true if success in parsing and encryption, otherwise false
     */
    public boolean setInteractionPayload(byte [] UserDeviceApduRepose) {     ← 402
        //Extract clear EMV tags from user device apdu response(s)
        byte [] baEmvTagsPayload = getEmvTagsFromUserDeviceResponse(UserDeviceApduRepose);    ← 404

//Get session key for EMV tags data encryption
        Key sessionKey = derivateSessionKeyFromKeyStore();     ← 406

//Encrypt the payload and sets to baEncryptedPayload
        baEncryptedPayload = encryptPayload(baEmvTagsPayload, sessionKey);    ← 408 return true;
    }
}
```

FIG. 4

SIMULATOR APPLICATION ON MOBILE DEVICE FOR INTEGRATION TESTING

CROSS-REFERENCE TO RELATED APPLICATIONS

This application is National Stage of International Application PCT/US2021/064176, filed on Dec. 17, 2021, which is herein incorporated by reference in its entirety.

BACKGROUND

Integration testing is a process by which multiple elements in a system can be tested to determine if those elements function together appropriately. As an example, in a system of computers, an integration test could be used to determine if the computers can communicate and collectively perform the functions of the system. Integration testing can involve "end-to-end" testing, where the system can be tested to determine if data can be successfully routed from one computer to another computer through the entire system.

Integration testing cannot easily be performed on some systems due to their design. These systems can include contactless access control systems. In an contactless access control system, a user typically provides a credential at a contactless access terminal (such as a transit gate terminal or point of sale (POS) terminal) using a user device (such as a smartphone or smart card). The user device and the contactless access terminal can communicate via any appropriate contactless means (such as near field communication (NFC)) in order to transmit the credential from the user device to the contactless access terminal.

The contactless access terminal, or an associated network of computers (such as an authorization computer) can evaluate the credential and determine if the user is authorized to access a resource guarded by the contactless access control system. For example, this resource could comprise a secure building, a subway or bus, copyright protected entertainment content, etc. In some cases, the credential can be included into an authorization request message that can be routed through the computer network to a processing computer (sometimes referred to as a processing network computer).

Afterwards, the contactless access control system can perform some (usually contextual) action or interaction based on credential evaluation. For example, if the contactless access control system corresponds to a transit gate terminal associated with a subway line, and the user presents a valid credential corresponding to the subway line, the contactless access control system can unlock the transit gate in order to grant the user access to the subway.

Typically, to perform integration testing on contactless access control systems, a technician can test the system using multiple test credentials. In some cases, these credentials can correspond to multiple test user devices. As an example, for a building access control system, the test user devices could comprise a "deck" of test identification cards. The technician can, for each test identification card, place the card in close proximity to the contactless access terminal, then monitor the generation and communication of messages between the contactless access terminal, the computer network, and an authorization computer in order to determine that the contactless access control system is working as intended.

This process can be time consuming, and in some cases physically laborious, requiring a technician to perform a repetitive card "tapping" motion hundreds or thousands of times. This testing problem is compounded when access devices cannot be easily reached by a technician. For example, there may be thousands of access devices within a specific geographic location. It is impractical and inconvenient for a human technician to travel to each and every access device to perform integration testing.

Conventional access devices are typically comprised very specific purpose hardware. Integration testing was easier because there were a relatively small number of different types of access devices that needed to be tested. Today, however, people can use a large variety of general purpose computing systems (such as cellular phones, smart phones, etc.) as contactless access terminals. An employee at a concert venue, for example, might use their own personal cell phone to scan a user's tickets using a downloaded "contactless acceptance application," in order to determine if the user is authorized to access the concert. This trend further complicates integration testing. Rather than performing integration testing using, for example, an industry standard ticket scanning machine, an integration tester may have to perform integration testing using every conceivable mobile device that an employee might use to scan tickets. This is impractical using existing integration testing methods.

Embodiments of the disclosure address this problem and other problems, individually and collectively.

SUMMARY

Integration tests, and other related tests (such as Layer 3 or "L3" tests) are often performed on contactless access control systems before those systems are deployed in practice. For example, testing a contactless transit gate control system prior to installing it in a subway station can prevent transit delays, commuter dissatisfaction, etc. As described above, integration testing for contactless access control systems can involve repeated contactless interfacing between test user devices (e.g., smartcards, smartphones, wearable devices) and a contactless access terminal. Because of the physical nature of this testing process (among other reasons), it can be time and labor intensive as well as difficult to automate. Further, due to the proliferation of non-traditional contactless access terminals, such as commercial off-the-shelf (COTS) mobile devices, integration testing often has to be repeated for a large variety of mobile devices, further increasing time and labor demands.

During a conventional contactless access terminal integration test, a test user device (e.g., a smartcard) may be put in proximity to a contactless interface on the mobile device (e.g., an NFC antenna). Using a kernel (e.g., a Europay, MasterCard, Visa (EMV) kernel) operating on the mobile device, the mobile device can communicate with the test user device to receive test user device data (e.g., EMV tags and their associated values). This test user device data can be provided to a contactless acceptance application (e.g., a ticket processing application, a contactless payment application, etc.), which can in turn be used by the mobile device to transmit an interaction message containing the test user device data through a processing network as part of the integration test. If there are multiple test user devices, multiple contactless acceptance applications, and/or multiple mobile devices, the integration test can be repeated for each combination of these test user devices, contactless acceptance applications, and mobile devices. A technician can monitor communications between the mobile device and computers in the processing network in order to determine if the integration test has been performed successfully.

By contrast, some embodiments address this problem using a simulator application and an associated resource file, which can be loaded onto mobile devices that are being used as contactless access terminals. During an integration test according to some embodiments, a simulator application can access test user device data stored in a resource file. The test user device data can be provided by the simulator application to a contactless acceptance application. The contactless acceptance application can in turn be used by the mobile device to transmit an interaction message containing the user device data through a processing network as part of the integration test. If there are multiple test user devices, the simulator application can advance through the resource file and obtain additional instances of test user device data. This process can be repeated for multiple mobile devices and contactless acceptance applications, if desired.

Notably, because the test user device data can be stored in a resource file on the mobile device, rather than on an external test user device, embodiments eliminate the need to perform contactless data exchanges between the mobile device and the test user devices. This reduces the physical and labor demands associated with the integration test. It also allows integration tests to be automated. Rather than requiring a human technician to repeatedly tap test user devices against mobile devices, the simulation application can automatically advance through the resource file, returning each user device data record until all of the simulated user devices have been tested. Consequently, embodiments make integration testing of mobile devices in contactless access control systems quicker, more convenient, and less labor intensive.

One embodiment is related to a method comprising: retrieving, by a simulator application on a mobile device, a first data record from a resource file, the resource file storing a plurality of data records associated with a plurality of user devices, the plurality of data records including at least the first data record and a second data record; generating, by the simulator application, a first interaction payload including the first data record; providing, by the simulator application, the first interaction payload to a first contactless acceptance application stored on the mobile device, wherein the first contactless acceptance application causes the mobile device to transmit a first interaction message comprising the first interaction payload to a first service provider computer, wherein the first service provider computer processes a first test interaction using the first data record included in the first interaction payload; retrieving, by the simulator application, the second data record from the resource file; generating, by the simulator application, a second interaction payload including the second data record; and providing, by the simulator application, the second interaction payload to the first contactless acceptance application, wherein the first contactless acceptance application causes the mobile device to transmit a second interaction message comprising the second interaction payload to the first service provider computer, wherein the first service provider computer processes a second test interaction using the second data record included in the second interaction payload.

Another embodiment is related to a mobile device comprising: a contactless element; a processor; and a computer readable medium coupled to the processor, the computer readable medium comprising instructions executable by the processor, to cause the mobile device to: retrieve, using a simulator application, a first data record from a resource file, the resource file storing a plurality of data records associated with a plurality of user devices, the plurality of data records including at least the first data record and a second data record; generate, using the simulator application, a first interaction payload including the first data record; provide, using the simulator application, a first interaction payload including the first data record; provide, using the simulator application, the first interaction payload to a first contactless acceptance application stored on the mobile device; transmit, to a first service provider computer, using the first contactless acceptance application, a first interaction message comprising the first interaction payload, wherein the first service provider computer processes a first test interaction using the first data record in the first interaction payload; retrieve, using the simulator application, the second data record from the resource file; generate, using the simulator application, a second interaction payload including the second data record; provide, using the simulator application, the second interaction payload to the first contactless acceptance application stored on the mobile device; and transmit, to the first service provider computer, using the first contactless acceptance application, a second interaction message comprising the second interaction payload, wherein the first service provider computer processes a second test interaction using the second data record in the second interaction payload.

Yet another embodiment relates to a system comprising: a service provider computer; and the abovementioned mobile device.

These and other embodiments of the present disclosure are described in more detail below. Prior to discussing specific embodiments of the disclosure, some terms may be described in detail.

Terms

A "server computer" may include a powerful computer or cluster of computers. For example, the server computer can include a large mainframe, a minicomputer cluster, or a group of servers functioning as a unit. In one example, a server computer can include a database server coupled to a web server. The server computer may comprise one or more computational apparatuses and may use any of a variety of computing structures, arrangements, and compilations for servicing the requests for one or more client computers.

A "memory" may include any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or XScale; and/or the like processor(s).

An "application" may include any computer program that is used for a specific purpose. An application may perform functions associated with its purpose using a "resource file." A resource file may include any digital representations of data used by the application to perform its function. An example of a resource file is a digital database. A resource file may comprise a number of "data records," or elements of data that can be accessed or identified using a "data index."

An "identifier" or "identification data" may include data used to identify something. This may include an object, entity (such as a person or business entity), computer system, transaction, method, data record, etc.

A "token" may include any substitute value for a credential. An "access token" may include any token used to access something. A token may comprise a string of numbers, letters, or any other suitable characters. Examples of tokens include access tokens, digital wallet tokens, virtual payment account numbers (VPANs), personal identification tokens, etc.

A "cryptogram" may include any packet of encrypted data. A cryptogram may be used to securely transmit sensitive data (such as transaction data or interaction data) through a public network such as the Internet. A cryptogram may be generated using a "cryptographic key" which may include any data used to perform encryption or decryption. A cryptogram may be generated using a "session key," a cryptographic key used to perform encryption or decryption in a particular session or sessions. Cryptographic keys (including session keys), may be stored in a "key store," a secure region of memory in a memory element.

A "user" may include any user of some object or service. This may include a user of a "user device" such as a smartphone, a smart card (e.g., a payment card such as a credit or debit card), etc. A user may be associated with one or more personal accounts (e.g., payment accounts) and/or user devices. A user may be referred to as a "cardholder" (when possessing or using a payment card), an account holder (when possessing or using an account), or a consumer (when using goods or services provided by resource providers).

A "resource provider" may include any suitable entity that provides resources (e.g., goods, services, access to secure data, access to locations, and/or the like) to other entities such as users. For example, a resource providing entity can be a merchant, a venue operator, a building owner, a governmental entity, etc. A "merchant" may typically include entities that engage in transactions and can sell goods or services, or provide access to goods or services.

A "mobile device" may include any suitable electronic device that may be transported and operated by an entity (such as a user or a resource provider), which may also provide remote communication capabilities to a network. A mobile communication device may communicate using a mobile phone (wireless network, wireless data network (e.g., 3G, 4G, 5G, or similar networks), Wi-Fi, Bluetooth, Bluetooth Low Energy (BLE), Wi-Max, or any other communication medium that may provide access to a network such as the internet or a private network. Examples of mobile devices include mobile phones (e.g., cellular phones), PDAs, tablet computers, net books, laptop computers, wearable devices (e.g., smartwatches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e., using the other device as a modem—both devices taken together may be considered a single mobile device).

An "access device" may include any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with a user device. An access device may also be referred to as an access terminal. An access terminal operating in a contactless mode may be referred to as a contactless access terminal. An access device can include radio frequency (RF) antennas, optical scanners, bar code readers, or magnetic stripe readers to interact with user devices.

An "interaction" may include any reciprocal action or influence. An example of an interaction is an exchange of data between two entities or a transaction between a merchant and a customer. "Interaction data" may include any data associated with an interaction, such as a transaction. "Transaction data" may include data associated with a payment transaction. Transaction data may include a transaction amount, a date or time associated with a transaction, a primary account number with a user initiating the transaction, etc. An "interaction message" may comprise a message that communicates some information about an interaction, which may include interaction data or an "interaction payload," a packet, element, or other unit of interaction data. An interaction message may comprise an authorization request message (defined further below).

A "contactless interaction" may include any interaction between two devices that does not require the devices to make physical contact with one another. Examples of contactless interactions can include communication between a smart card and a smart card reader via NFC. This is in contrast to, for example, a data transfer via an Ethernet cord, where two devices are in "contact" via the Ethernet cord. Notably, device contact can take place in a contactless interaction, for example, a user can physically "taps" their smart card against a card reader during a contactless interaction.

An "acquirer" may include an entity that processes payments on behalf of a resource provider, such as a merchant. An acquirer may comprise a financial institution, such as a bank, that maintains an account for a merchant. An acquirer may operate an "acquirer computer," a computer system that can be used to transmit payment information through networks such as the Internet, including, for example, authorization request messages and authorization response messages.

A "processing network" may include a network used to process, support, and deliver data services. An example of a processing network is a "payment processing network" that may include data processing subsystems, networks, server computers and operations used to support and deliver authorization services, exception file services, and clearing and settlement services. A payment processing network may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions. A processing network may comprise one or more "processing network computers."

"Authentication data" may include any data suitable for verifying or authenticating something. Authentication data may include data authenticating a user or a mobile device. Authentication data may be obtained from a user or a device that is operated by a user. Examples of authentication data obtained from a user may include PINs (personal identification numbers), biometric data, passwords, etc. Examples of authentication data that may be obtained from a device may include device serial numbers, hardware secure element identifiers, device fingerprints, phone numbers, IMEI numbers, etc.

An "authorization request message" may include any electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or a payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may include any electronic message that responds to an authorization request. In some cases, an authorization response message may comprise an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., PA equipment) that indicates approval of the transaction. The code may serve as proof of authorization.

An "integration test" may include any test used to determine if elements of a system integrate successfully. For example, an integration test may be used to determine if computer in a computer network can communicate or otherwise function together. A "layer-3 test" or "L3 test" may include any test used to determine if messages can be routed between source computers and destination computers in an a computer network.

BRIEF DESCRIPTION OF THE DRAWINGS

FIG. 3 illustrates pseudocode corresponding to an exemplary simulator application according to some embodiments.

FIG. 4 illustrates pseudocode corresponding to an exemplary function for generating interaction payloads according to some embodiments.

DETAILED DESCRIPTION

Figure 1:
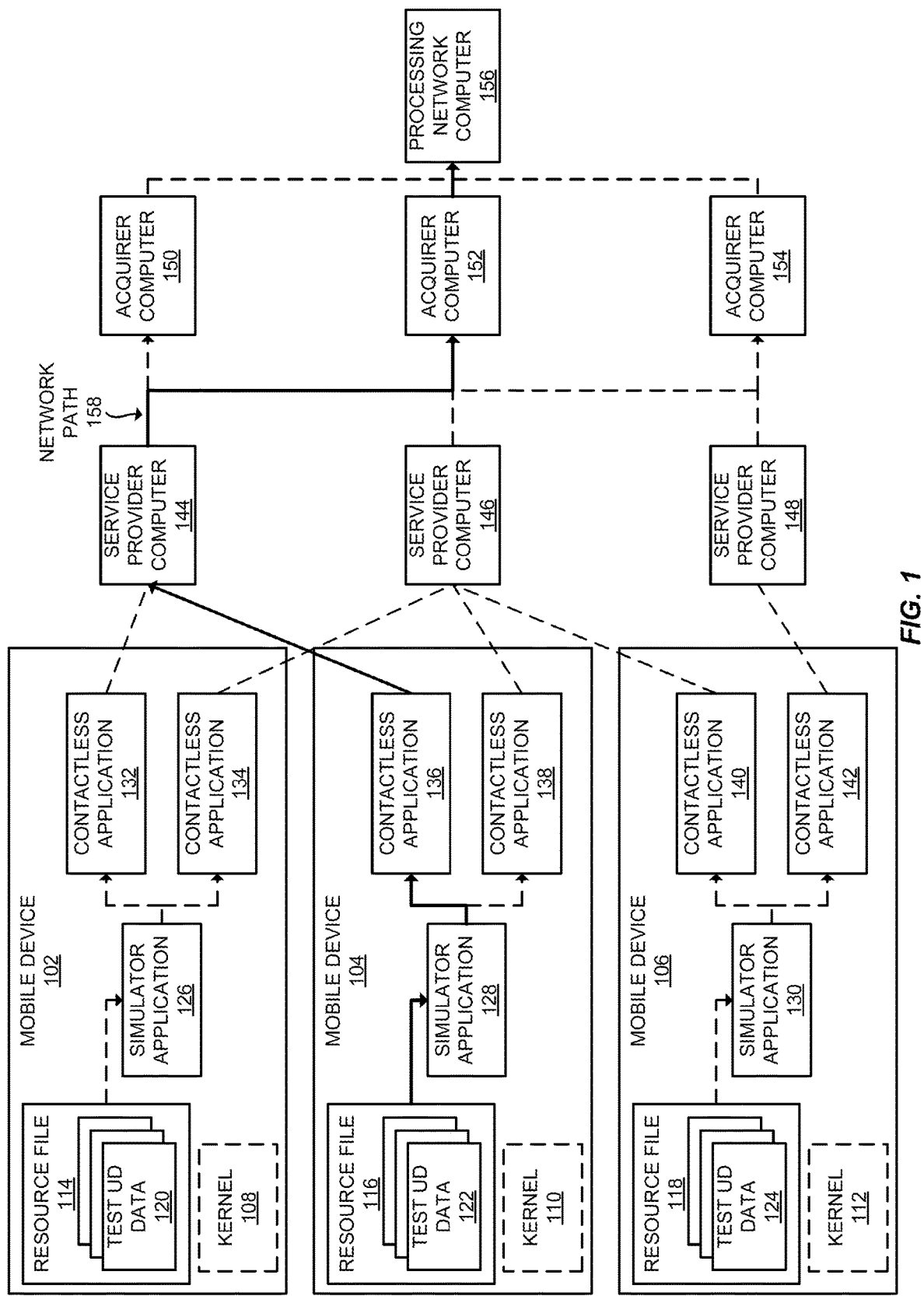
FIG. 1 illustrates a system diagram of an exemplary integration testing system according to some embodiments.

Before describing some embodiments in more detail, it may be useful to describe contactless access control systems and processes used to perform integration tests on such systems. Broadly, a contactless access control system refers to a system used to control access to resources using a contactless access terminal. A contactless access terminal (or "contactless terminal") refers to a device or devices that interface with a user device via a contactless interface. Contactless access terminals may include general purpose mobile devices (e.g., smartphones) that have software enabling those devices to act as contactless access terminals. As described above, a user device may comprise a device such as a smart card, a smart phone, etc. The user device may store a credential that can be used to authenticate or authorize the user to access resources protected by the contactless access control system.

As one example, a contactless access control system could be used to control access to a metro line (i.e., a resource). A user could place their metro card (user device) near a near-field communication (NFC) reader (contactless terminal) located near a turnstile. The NFC reader can communicate with the metro card in order to receive a credential. The NFC reader can transmit the credential to a processing computer (sometimes referred to as a processing network computer). The processing computer can evaluate the credential in order to determine if the user is authorized to access the metro line. If the user is authorized to access the metro line, the processing computer can transmit a signal to the turnstile, unlocking the turnstile and allowing the user access to the metro line. The user is then free to board a train, subway car, etc.

As another example, a contactless access control system could be used to control access to goods or services (resources) provided by a merchant. During a transaction (interaction), a customer (user) can place their payment card (user device) near an NFC point-of-sale (POS) terminal (contactless terminal) located near a checkout counter. While in the past the NFC POS terminal may have comprised a specialized piece of hardware, today, due to advancements in mobile device and NFC technology, an NFC POS terminal may comprise a wide variety of mobile devices, such as smartphones, tablets, wearable devices, laptop computers, etc. The payment card and NFC POS terminal can communicate (e.g., according to the EMV specification) in order to transmit user device data (e.g., payment card data EMV tags, etc.) to the NFC POS terminal. The NFC POS terminal (or an associated merchant computer) can generate an authorization request message, which may comprise a payment cryptogram and/or a "payload" comprising the encrypted user device data.

This authorization request message can be routed through a series of computer in a payment network (e.g., a three-party network, four-party network, etc.). These can include, for example, a "service provider computer" (sometimes referred to as a "payment service provider" computer), a computer system that can route transaction information on behalf of merchants to associated acquirers (e.g., banks that maintain financial accounts for those merchants). The service provider computer can route the authorization request message to an acquirer computer, which can subsequently route the authorization request message to a processing network computer. The processing network computer can comprise a computer system associated with a payment processing network such as Visa, which may be associated with the user's payment card (e.g., the user's payment card may comprise a Visa credit card). The processing network computer can subsequently route the authorization request message to an issuer computer (sometimes referred to as an authorization computer), which may comprise a computer system associated with a bank that maintains a financial account on behalf of the user.

Afterwards, the issuer computer can evaluate the authorization request message and generate an authorization response message. The authorization response message can indicate whether the transaction has been approved or denied, and can include any other relevant information. The authorization response message can be transmitted back to the NFC POS terminal or merchant computer via processing network computer, acquirer computer, service provider computer, etc. If the transaction is approved, the merchant can provide the user with the requested goods or services.

Performing integration testing on such contactless access control systems involves testing how the devices and computer systems in such a network work together as a group. Broadly, because such access control systems generally function to transmit a credential from a user device to a processing network computer, integration testing generally involves determining whether the contactless access control system can successfully transmit the credential from the user device, through the network, and to the processing network computer. In this way, integration tests on contactless access control systems are closely related to layer 3 (L3) tests on general network systems. Integration tests are often performed prior to deploying contactless access control systems.

As an example, in order to perform integration testing on the exemplary metro line contactless access control system described above, a technician may use a stack (or "deck") of test metro cards. The technician may tap each metro card, in sequence, against the contactless terminal and determine if the turnstile unlocks. In addition, the technician may monitor data produced by any other devices or computer systems in the contactless access control system (such as the processing network computer). This may include, for example, determining whether rides (or other units of use, such as cash funds) are successfully debited from test accounts associated with each test metro card.

As another example, in order to perform integration testing on the exemplary payment card contactless access control system described above, a technician may use a deck of test payment cards. The technician may tap each test payment card, in sequence, against the NFC POS terminal, and determine if the credential (e.g., payment card data) is successfully routed to the processing network computer. The technician may monitor whether, for example, the NFC POS terminal (or an associated computer system) successfully generates an authorization request message, a payment cryptogram, a payload, etc., as part of the integration test.

However, the use of general purpose (sometimes referred to as "commercial off the shelf" or "COTS") mobile devices as contactless terminals greatly complicates the integration testing procedure. In the metro card example, there may only be one model of "turnstile contactless metro card reader" for a given metro station. By contrast, for a merchant application, there may be thousands of different mobile devices (e.g., thousands of different models of smartphones, tablets, etc.) that can be used as NFC POS terminals (or other contactless access terminals). As such, a technician may have to repeat the testing process for each mobile device. If a new mobile device enters the market at any time, a technician may have to perform the testing process on that mobile device. This process is inefficient in terms of time and labor intensity.

Some embodiments however, provide for new methods and new contactless access control system architectures that enable the efficient automation of integration testing on mobile device-based contactless access control systems. FIG. 1 shows a system block diagram of an exemplary contactless access control system according to some embodiments. The exemplary contactless access control system of FIG. 1 enables faster and more efficient integration testing.

FIG. 1 shows three mobile devices 102-106, although in practice, the contactless access control system of FIG. 1 can comprise any number of mobile devices. Each mobile device can be tested as part of an integration test. The integration test can involve determining whether test user device data (e.g., test user device data 120-124) can be used to generate an interaction payload, which can in turn be routed to processing network computer 156 through a network path.

There are a number of possible network paths in FIG. 1, indicated by dashed lines. These network paths may result from specific relationships between acquirers, service providers (e.g., payment service providers), and contactless acceptance application developers. For example, a particular service provider may have developed a particular contactless acceptance application, and may require that the contactless acceptance application transmits interaction payloads to a corresponding service provider computer. Network path 158, indicated by a bolded line, shows one possible path by which test user device data 122 can be retrieved by simulator application 128 and used to generate an interaction payload that can be routed via contactless application 136, service provider computer 144 and acquirer computer 152 to processing network computer 156 during an integration test.

Typically, in a conventional integration test, mobile devices 102-106 would use their respective kernels 108-110 to receive user device data from test user devices (e.g., a deck of test smart cards). However, in methods according to embodiments, integration testing can be performed with each mobile device 102-106 using a corresponding simulator application 126-130 loaded onto mobile devices 102-106. The simulator applications 126-130 can each access a corresponding resource file 114-118. Each resource file 114-118 can store test user device data 120-124. The test user device data 120-124 can comprise data records comprising user device data that would be retrieved from test user devices (e.g., a deck of test smartcards) during a conventional contactless interaction between a mobile device and a test user device (e.g., contactless interactions facilitated by kernels 108-112). This could include, for example, EMV tags and their associated data values.

As an alternative, the test user device data 120-124 can comprise software simulations or emulations of test user devices. As described in more detail below with reference to FIG. 6, the simulator applications 126-130 can simulate or emulate the communication flow that would take place during a conventional contactless interaction with the simulations or emulations of test user devices, in order to retrieve the corresponding user device data.

Once a simulator application has acquired the test user device data from its respective resource files, it can use the test user device data to generate an interaction payload. The interaction payload can comprise encrypted test user device data. In some embodiments, the test user device data can be encrypted using a session key stored on the mobile device. A simulator application can provide the generated interaction payload to a contactless acceptance application (e.g., from among contactless acceptance applications 132-142) stored on the corresponding mobile device. These contactless acceptance applications can comprise, for example, mobile payment applications.

After receiving an interaction payload, a contactless acceptance application can generate an interaction message (e.g., an authorization request message) using the interaction payload. The interaction message can then be routed to a processing network computer 156 via a network path, such as network path 158. In some embodiments, the processing network computer 156 can transmit a response message back to the contactless acceptance application, indicating whether the interaction message and interaction payload were successfully received by the processing network computer.

The process described above can be repeated for any number of user device data records, contactless acceptance applications, mobile devices, etc. For example, resource file 114 (used to test mobile device 102) could comprise 10 test user device data records 120. Simulator application 126 can use an index or other identifier to identify the first data record, generate a first interaction payload using the first data record, then transmit the first interaction payload to contactless acceptance application 132. Afterwards, simulator application 126 can advance the index and identify a second data record, generate a second interaction payload using the second data record, then transmit the second interaction payload to contactless acceptance application 132. This can be repeated for all 10 exemplary test user device data records 120. If necessary, this process can be repeated for contactless acceptance application 134. Additionally, the other mobile devices 104 and 106 can also be tested for any combination of user device data and contactless acceptance applications. Multiple mobile devices can be tested simultaneously. Because the integration tests are conducted using resource files and simulator applications, and not physical test user devices, the mobile devices 102-106 can be configured to execute each integration test automatically and sequentially, eliminating the need for a human technician.

It should be understood that the computers and other devices (e.g., the mobile devices 102-106, the service provider computers 144-148, the acquirer computers 150-154, the processing network computer 156, etc.) in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), etc.

Figure 2:
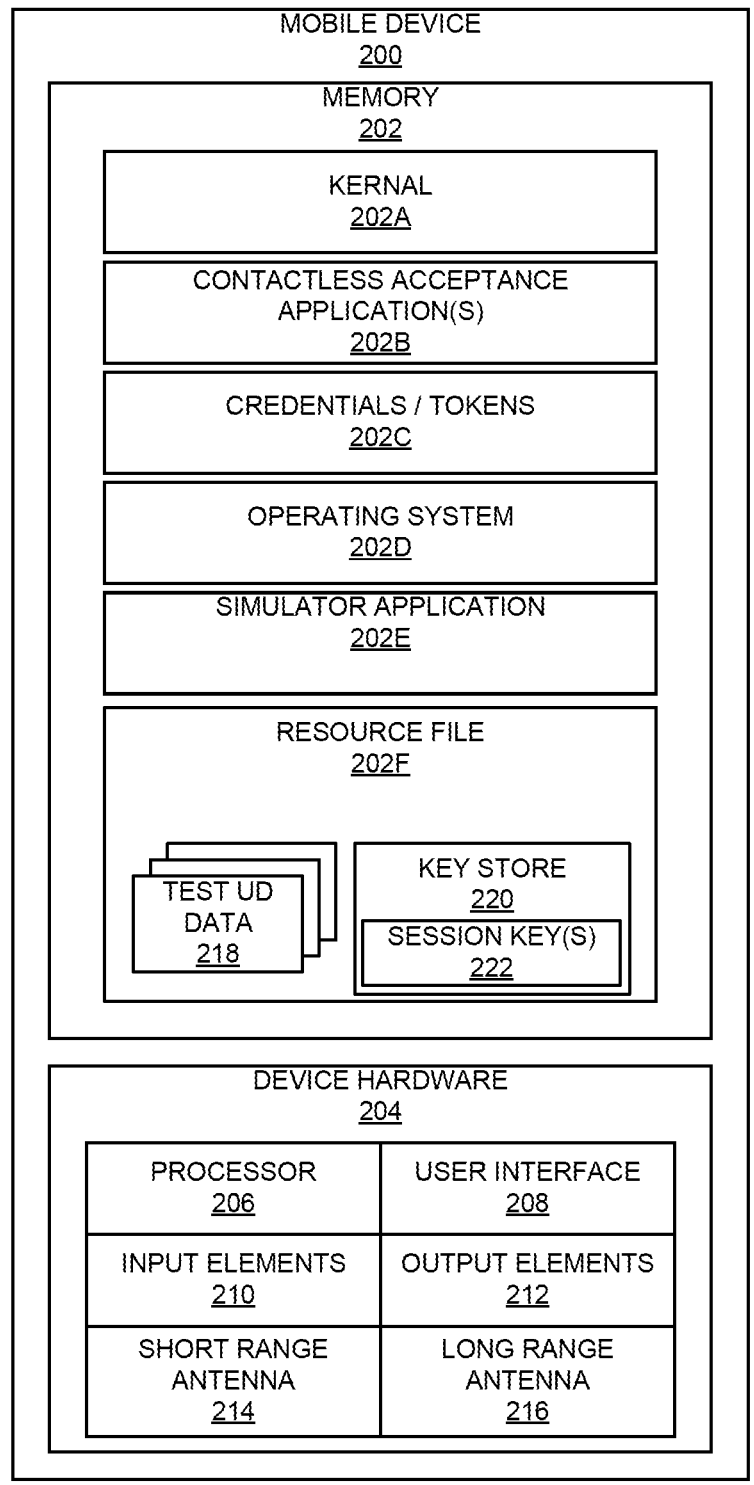
FIG. 2 illustrates an exemplary mobile device according to some embodiments.

FIG. 2 illustrates a mobile communication device 200 according to some embodiments. Mobile communication device 200 may include device hardware 204 coupled to a system memory 202 which may include a computer readable medium 202.

Device hardware 204 may include a processor 206, a short range antenna 214, a long range antenna 216, input elements 210, a user interface 208, and output elements 212 (which may be part of the user interface 208). Examples of input elements may include microphones, keypads, touchscreens, sensors, etc. Examples of output elements may include speakers, display screens, and tactile devices. The processor 206 can be implemented as one or more integrated circuits (e.g., one or more single core or multicore microprocessors and/or microcontrollers), and is used to control the operation of mobile communication device 200. The processor 206 can execute a variety of programs in response to program code or computer-readable code stored in the system memory 202, and can maintain multiple concurrently executing programs or processes.

The long range antenna 216 may include one or more RF transceivers and/or connectors that can be used by mobile communication device 200 to communicate with other devices and/or to connect with external networks. The user interface 208 can include any combination of input and output elements to allow a user to interact with and invoke the functionalities of mobile communication device 200. The short range antenna 214 may be configured to communicate with external entities through a short range communication medium (e.g. using Bluetooth, Wi-Fi, infrared, NFC, etc.). The long range antenna 214 may be configured to communicate with a remote base station and a remote cellular or data network, over the air.

The system memory 202 can be implemented using any combination of any number of non-volatile memories (e.g., flash memory) and volatile memories (e.g. DRAM, SRAM), or any other non-transitory storage medium, or a combination thereof media. The system memory 202 may store computer code, executable by the processor 206, for performing any of the functions described herein. For example, the system memory 202 may comprise a computer readable medium comprising code, executable by the processor 206, for implementing a method comprising: receiving, from a test computer, an interaction input message comprising first data over a network-based communication channel; generating an interaction output message in response to receiving the interaction input message; and transmitting the interaction output message to the test computer over the network-based communication channel.

The system memory 202 may also store a kernel 202A, application(s) 202B, credentials/tokens 202C, an operating system 202D, a simulator application 202E, and a resource file 202F. The resource file can comprise data records corresponding to test user device data 218 and a key store 220. The key store 220 can store one or more session key(s) 222 or data that may be used to derive session key(s) 222.

The kernel 202A may be a contactless kernel. Code comprising the kernel 202A can be stored within the application 202B or external to it. The kernel 202A may provide some basic functionality for the application 202B. For example, the kernel 202A may provide code for certain responses that are produced or actions that are performed in response to messages that are received by the kernel 202A. In a conventional contactless integration test, the kernel 202A may comprise code, executable by the processor 206 for performing several functions associated with the transmission of interaction data from a test user device (e.g., a test smartcard) to the mobile device 200. However, in some embodiments, this test interaction data can be provided by the resource file 202F, and the kernel 202A may not be needed for integration testing.

Contactless acceptance application(s) 202B can allow the mobile device 200 to behave like an access device that can receive and process data from a contactless user device such as a contactless card (e.g., a contactless payment card). The contactless acceptance application(s) 202B can include code for reading and processing user device data from user devices. The user device data can include interaction payloads, which may comprise encrypted data elements corresponding to user device data (e.g., payment account numbers, card verification values, tokens, etc.). The contactless acceptance application(s) 202B can allow the mobile device 200 to generate interaction messages (including, e.g., authorization request messages) using user device data. Additionally, the contactless acceptance application(s) 202B can enable the mobile device 200 to transmit authorization request messages to authorizing entity computers (via, for example, a processing network comprising a processing network computer), and receive and process authorization response messages from authorizing entity computers.

System memory 202 may also store credentials and/or tokens 202C. Credentials may also include information identifying the mobile communication device 200 and/or the user of the mobile communication device 200. Examples of credentials may include a public key associated with the mobile communication device 200 and/or a user of the mobile communication device 200, a digital signature (e.g., the public key of the mobile communication device 200 signed by a key of the authentication system), payment credentials, biometric data (e.g., biometric samples or templates), etc.

Simulator application 202E may comprise an application used to simulate or emulate a contactless interaction with a test user device. In doing so, simulator application 202E may eliminate the need to use physical test user devices during integration testing, making integration tests easier to perform and automate. The simulator application 202E may retrieve test data from a resource file 202F, including test user device data 218, which the simulator application 202E can use to generate interaction payloads that can be provided to the contactless acceptance application(s) 202B during an integration test.

Resource file 202F may comprise data used by simulator application 202E in order to facilitate integration testing. This may include test user device data 218. It may also include a key store 220. The key store 220 may store one or more session key(s) 222 that may be used to generate interaction payloads by encrypting test user device data records. Alternatively, the key store 220 may store other cryptographic data used to generate the session key(s) 222, such as a master cryptographic key, or seed values used to generate the session key(s).

Test user device data 218 may comprise a number of data records corresponding to test user devices. These data records can comprise, for example, recorded or simulated APDU (application protocol data units) responses received from test user devices, including the results of a "GPO response," the result of a "Read Record response," EMV tags and their associated values, etc. Alternatively, each data record could comprise code to simulate or emulate the functions of a contactless user device (e.g., a smartcard) in software. The simulator application 202E and a test user device data record 218 can simulate or emulate a conventional contactless data transfer, in order to transfer relevant interaction (e.g., transaction) data to the simulator application, such as a GPO response and a Read Record response.

FIG. 3 illustrates some pseudocode corresponding to an integration test according to some embodiments. Similar code can be included in the simulation application and used by the simulation application during integration testing.

Line 302 comprises code used to initialize a resource file index or user device index to 1. This resource file index can be used to retrieve corresponding user device data records from the resource file. A resource file index of "1" may correspond to the first user device data record in the resource file, while a resource file index of "2" may correspond to the second user device data record, and so on.

Line 304 comprises code corresponding to an inequality test performed during an integration testing function "DoContactlessInteraction( )." The simulation application can check if the resource file index is greater than a defined value. If the resource file index is greater than this value, it may indicate that there are no more user device data records to test. If so, the integration testing function can return a "null" value.

Line 306 Corresponds to a Function "GetUserDeviceDataFromResourceFile( )," used to retrieve user device data from the resource file. The function can use the resource file index as an argument, and return the user device data record corresponding to that index. Afterwards, at line 308, the resource file index can be advanced to the next value (e.g., from 1 to 2, from 2 to 3, etc.) such that during the next call of "DoContactlessInteraction( )" the simulator application can retrieve the next user device data record to use during the integration test.

At lines 310, the simulation application can create a new interaction data object. This interaction data object can comprise an interaction payload. The interaction payload can be generated using the setInteractionPayload( ) member function, which takes the user device data record as an argument, encrypts it, and includes it in the interaction data object. Afterwards, at line 312, the simulation application can return the interaction payload to a contactless acceptance application.

FIG. 4 illustrates some pseudocode corresponding to the "setinteractionPayload( )" method referenced above. This member function can be used to generate an interaction payload using user device data retrieved from a resource file. As indicated in line 402, the user device data can comprise APDU user device responses.

At line 404, the simulator application can extract EMV tags and their associated data values from the user device data, and store them in a variable "baEmvTagsPayload." Subsequently, the simulator application can derive a session key from a key store at step 406, then use the session key to encrypt the EMV tags and associated data values using the session key and an "encryptPayload( )" function.

Figure 5:
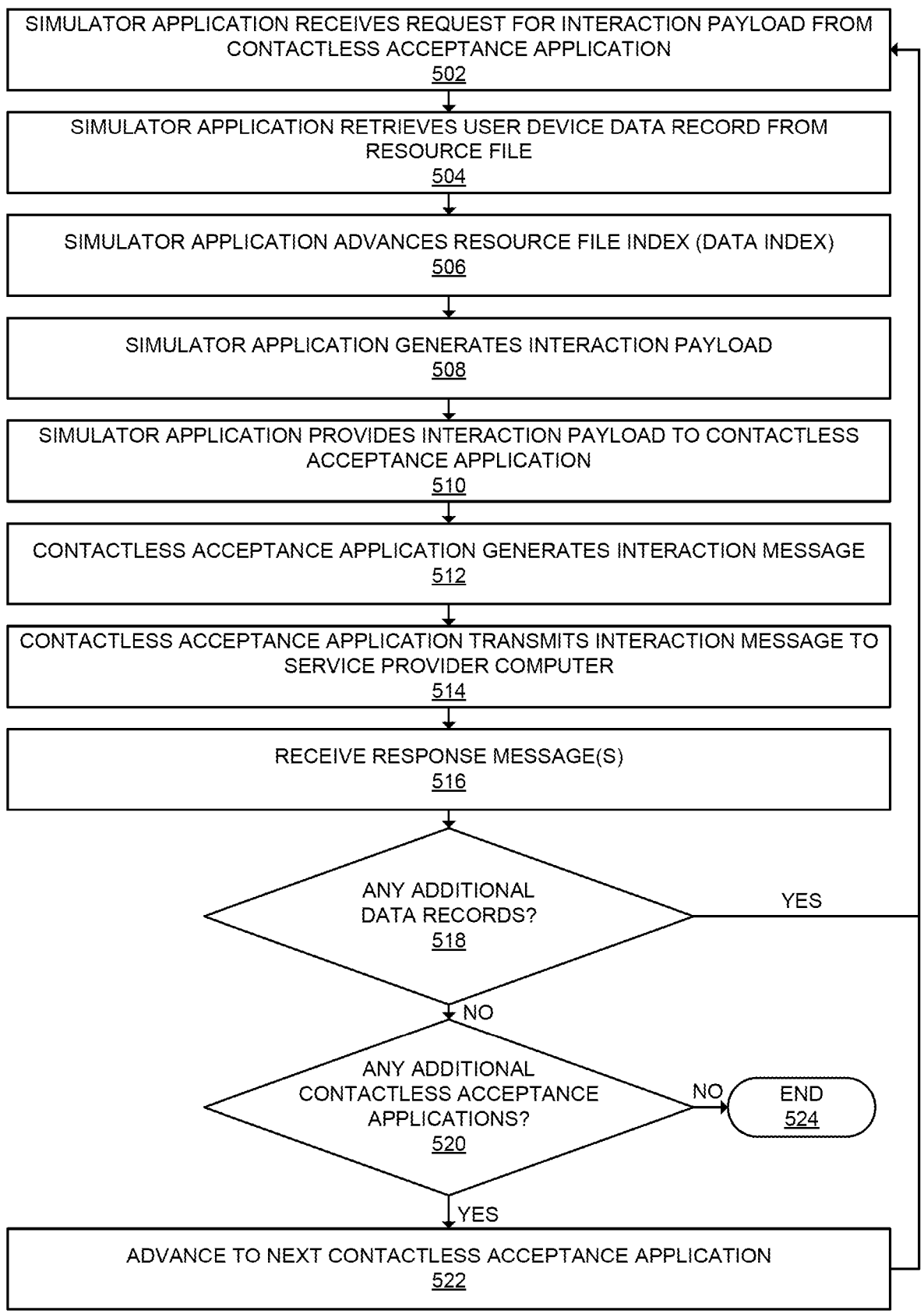
FIG. 5 illustrates a flowchart of an exemplary method of integration testing according to some embodiments.

FIG. 5 illustrates a flowchart of an exemplary integration testing method according to some embodiments. This integration testing method may be executed by a mobile device operating a simulation application and a contactless acceptance application. The simulation application may include code or instructions similar to the pseudocode described above with reference to FIGS. 3 and 4.

After viewing FIG. 5 and reading the following description, several implementation variations on these methods may become apparent. As one example, there may be different techniques by which user device data can be retrieved from the resource file, e.g., either "directly" or via a simulation or emulation of a contactless data transfer (as described with reference to FIG. 6). Other variations, such as the use or disuse of resource file (or data record) indices may also become apparent. It should be understood that FIG. 5 is provided for the purpose of example, and is not intended to exhaustively detail each and every method according to embodiments. Further, it should be understood that the flowchart of FIG. 5 corresponds to an integration testing process performed on a single mobile device. Any methods corresponding to FIG. 5 can be repeated for any number of mobile devices, as desired or required by entities performing the integration testing process.

Prior to executing the integration testing method, the simulator application and resource file may be loaded onto the mobile device using any appropriate means, e.g., downloading the simulator application and resource file from a web server, loading the simulator application and resource file from an external media source (e.g., a USB drive, external hard drive, etc.), etc. Additionally, the simulator application may perform any appropriate setup steps prior to executing the integration test, such as initializing a resource file index (also referred to as a data index) to a value such as 1, as described above with reference to FIG. 3. Note that not all embodiments may use a resource file index. Alternatively, some embodiments may use a resource file index, but the resource file index may be provided to the simulator application by a contactless acceptance application. Thus this setup step may be optional.

At step 502, the simulator application can receive a request for an interaction payload from a contactless acceptance application. Note that multiple contactless acceptance applications may be operating on the mobile device. These contactless acceptance applications may be denoted "a first contactless acceptance application," "a second contactless acceptance application," "a third contactless acceptance application," etc. The terms "first," "second," and "third," are intended only to differentiate these contactless acceptance applications.

The simulator application may receive the request for an interaction payload via an API that facilitates communication between the simulator application and one or more contactless acceptance applications operating on the mobile device. The request may take the form of a request message. The request message may indicate that the contactless acceptance application is requesting an interaction payload in order to perform an integration test. The request may comprise any additional information needed to retrieve a user device data record from the resource file and generate an interaction payload using the user device data record. For example, the request can comprise identification data. This identification data can be used by the simulator application to identify a user device data record stored in the resource file. The identification data can comprise, for example, a data index. The data index can point to a specific data record in the resource file. For example, a data index "1621" can identify the $1621^{st}$ user device data record in the resource file. Alternatively, the identification data can comprise a user device identifier. A user device identifier such as "Visa_Contactless_Mexico_4" could be used to identify a simulated user device comprising a contactless Visa credit card "issued" in Mexico.

At step 504, the simulator application can retrieve a user device data record from the resource file, which may store a plurality of data records associated with a plurality of (real or simulated) user devices. These data records may be denoted a "first data record," a "second data record," a "third data record," etc. The terms "first," "second," and "third," are intended only to differentiate these data records. The simulator application can use a resource file index (as shown in FIG. 3) or any identification data provided in the request to retrieve this data record.

The user device data records may each comprise sets of APDU responses, data that might be transmitted by a physical user device to the mobile device during a typical contactless interaction. For example, these APDU responses cam comprise responses to "GPO Commands" and/or "Read Record Commands." The APDU responses can comprise EMV tags and their associated data values. The user device data records, comprising these APDU responses, can be stored in plaintext in the resource file. The simulator application can retrieve a user device data record by reading or otherwise interpreting the record from the resource file.

Figure 6:
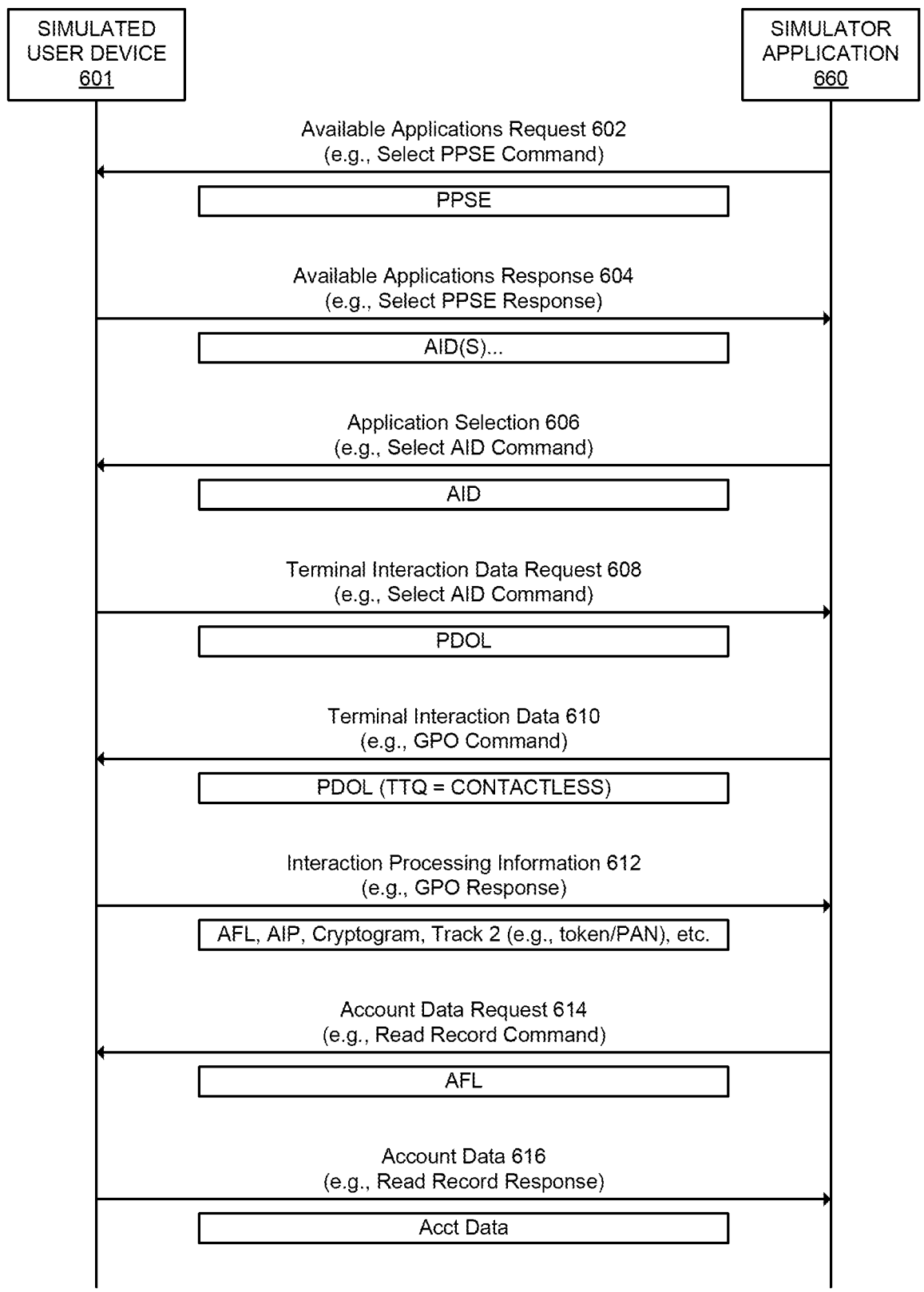
FIG. 6 illustrates a sequence diagram corresponding to an exemplary contactless interaction dataflow according to some embodiments.

As an alternative, the resource file can comprise digital simulations or emulations of user devices (such as contactless EMV payment cards). Instead of directly retrieving user device data records from the resource file, the simulator application can simulate EMV contactless data exchanges with simulated user devices stored in the resource file. The result of these EMV contactless data exchanges may comprise the data record(s) (e.g., a first data record, a second data record, etc.) described above. This may be advantageous if a tester wants the integration testing process to better match conventional integration testing processes. FIG. 6 (described in more detail further below) shows a sequence diagram detailing how this process could be performed.

At step 506, if the mobile device uses the simulator application to retrieve the data record from the resource file using a data record index, the mobile device can use the simulator application to increment the data record index, such that the data record index now "points" to the next user device data record in the resource file, as indicated by the pseudocode at line 308 of FIG. 3. For example, if the data record index was previously indicating the $21^{st}$ data record, the data record index can be incremented to indicate the $22^{nd}$ data record.

At step 508, the simulator application can generate an interaction payload including the user device data record retrieved at step 504. The simulator application can use code, similar to the pseudocode of FIG. 5 to generate the interaction payload. The simulator application can generate the interaction payload by encrypting the user device data record. In some embodiments, the user device data record can be encrypted using a session key. This session key can be derived by the simulator application from a key store, such as key store 220 in FIG. 2.

In some embodiments, as described with reference to FIG. 5, the user device data record can comprise one or more APDU responses. The simulation application can first extract one or more EMV tags and their associated data values from the one or more APDU responses, then generate the interaction payload by encrypting the one or more EMV tags, rather than encrypt the APDU responses in their entirety.

At step 510, the simulator application can provide or return the interaction payload to the requesting contactless acceptance application stored on the mobile device. The simulator application can return the interaction payload via, for example, an API used to facilitate communication between the simulator application and the requesting contactless acceptance application.

At step 512, the contactless acceptance application can generate an interaction message using the interaction payload. The interaction message may comprise an authorization request message or a test authorization request message. The interaction message may conform to any appropriate standard, such as ISO 8583. The interaction message may contain any additional information provided by the mobile device or an operator of the mobile device. For example, for transaction interactions, the interaction message may comprise a merchant identifier, used to identify the merchant associated with the transaction, or any other relevant transaction data.

At step 514, the mobile device can use the contactless acceptance application to transmit the interaction message comprising the interaction payload to a service provider computer. The service provider computer can then process a test interaction using the data record included in the interaction payload. The service provider computer can either process the test interaction directly (e.g., by decrypting the interaction payload and evaluating the data record to confirm its validity, authenticity, etc.) or by communicating with other computers in a processing network. For example, the service provider computer can forward the interaction message to an acquirer computer, which can then forward the interaction message to a processing network computer, as depicted in FIG. 1. The processing network computer can then process the test interaction using the data record included in the interaction payload, and can optionally transmit an authorization response message or a test authorization response message back to the mobile device via the processing network.

At optional step 516, the mobile device can receive one or more response messages corresponding to one or more interaction messages transmitted by the mobile device (e.g., at step 514). These response messages may comprise authorization response messages. The response messages may indicate whether the integration test interactions (e.g., a first test interaction, a second test interaction, etc.) were processed successfully, indicating that integration were successful. Notably, step 516 can occur any time after the mobile device transmits an interaction message to the processing computer. It does not need to occur immediately following step 518, as indicated by the flowchart.

At step 518, if there are any additional user device data records to test, the flowchart can proceed back to step 502. Otherwise, if there are no additional user device data records to test, the flowchart can proceed to step 520. The simulator application can use an inequality check, such as the inequality check depicted at line 304 of FIG. 3, to determine if the resource file index has exceeded the length of the resource file. If so, the simulator application can determine that there are no additional data records to use for integration testing.

If there are additional data records to test, the simulator application and the contactless acceptance application can effectively repeat the abovementioned process using the additional data records. For example, if a first data record was used to generate a first interaction payload as part of a first integration test, during a second integration test the simulator application can receive a second data record from the resource file and use the second data record to generate a second interaction payload. The second interaction payload can be provided to the requesting contactless acceptance application, which can then generate a second interaction message. The mobile device can use the contactless acceptance application to transmit the second interaction message to the service provider computer, which can then process a second test interaction using the second data record included in the second interaction message.

In some embodiments, performing check step at 518 may be automated, and the mobile device can immediately or near immediately proceed with performing additional integration tests. As such, the time between generating one interaction payload (e.g., a "first interaction payload") and another interaction payload (e.g., a "second interaction payload") may be, for example, less than one minute.

This process can be repeated, as described above, for one or more other data records stored in the resource file. The one or more other data records can be used to generate one or more interaction payloads that can be provided to the requesting contactless acceptance application. The one or more interaction payloads can be used to generate one or more other interaction messages, which can be sent to a service provider computer in order to test one or more other test interactions.

At step 520, the mobile device can determine if the integration testing process should be repeated for any additional contactless acceptance applications stored on the mobile device. In some cases, a mobile device may possess multiple contactless acceptance applications developed by competing contactless acceptance application developers. As such, it may be appropriate to perform integration tests using different contactless acceptance applications to confirm that interaction data can be processed under a variety of conditions. If there are additional contactless acceptance applications to test, the flowchart can advance to step 522. If there are no additional contactless acceptance applications to test, the flowchart can advance to end step 524.

At step 522, the mobile device can advance to the next contactless acceptance application. This can comprise, for example, the mobile device activating or otherwise executing the next contactless acceptance application. Afterwards, the mobile device can proceed to step 502 and repeat the integration testing process.

This can comprise, for example, the simulator application receiving, from a second (third, fourth, etc.) contactless acceptance application, a request for an interaction payload. The simulator application can retrieve a corresponding data record from the resource file and generate an interaction payload including the corresponding data record. The interaction payload can then be provided to the second contactless acceptance application. The mobile device can then use the second contactless acceptance application to generate an interaction message and transmit it to a second service provider computer. This second service provider computer may be the same or different from a service provider computer associated with a different contactless acceptance application. The second service provider computer can then process a test interaction using the data record included in the interaction payload, as described above.

FIG. 6 illustrates an example communication flow between a simulated (or emulated) user device 601 and a simulator application 660 during a simulated (or emulated) contactless interaction according to some embodiments. This communication flow can result in the simulator application retrieving user device data from the resource file, e.g., as described above in step 504 in FIG. 5. In some embodiments, the communications can be in the form of APDU commands and responses. However, it should be understood that other messages, messaging protocols, or formats can be used to exchange the relevant information to conduct the interaction.

The simulator application 660 can initiate an interaction by sending an available applications request 602 to simulated user device 601 to request information on which application(s) (e.g., a list of AID(s)) may be available on the simulated user device 601. In some embodiments, the available application(s) request 602 may be in the form of a select PPSE command. If applicable, the available applications request 602 may include a payment environment identifier (e.g., a PPSE name such as "2PAY.SYS.DDF01") to identify the payment environment supported by the simulated user device 601 and the simulator application 660.

Upon receiving the available applications request 602, simulated user device 601 may identify and process the request by recognizing the payment environment identifier (e.g., PPSE name) included in the request, and respond by sending an available applications response 604 back to simulator application 660. The available applications response 604 may include a list of available AIDs, and may include the payment environment identifier (e.g., PPSE name) as the dedicated file name. In some embodiments, the available applications response 604 may be in the form of a select PPSE response and may include PPSE file control information (FCI). For example, the available applications response 604 may include a directory entry for each available AID. If the simulated user device 601 supports only one AID (irrespective of the number of accounts related to that AID), the simulated user device 601 may respond with a single directory entry for the supported AID. If the simulated user device 601 supports an account with multiple AIDs, the simulated user device 601 may respond with a directory entry for each of the supported AIDs. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available application(s) response 604 may also include other data such as FCI issuer discretionary data.

When simulator application 660 receives the available applications response 604, simulator application 660 may select a suitable application from the list of applications received in the available applications response 604 (e.g., by selecting an AID from the available AID(s) received in the available application(s) response 604). In some embodiments, the selected AID can be the highest priority AID that is supported by simulator application 660. Simulator application 660 may send an application selection 606 with the selected AID to the simulated user device 601 to continue the interaction. In some embodiments, the application selection 606 can be in the form of a select AID command.

Upon receiving the application selection 606, the simulated user device 601 may send a terminal interaction data request 608 to request interaction data from access device 660 which may be needed to execute the interaction using the selected application/AID. In some embodiments, the terminal interaction data request 608 may be in the form of a select AID response and may include AID file control information (FCI) with the selected AID as the dedicated file name. The terminal interaction data request 608 may include a list of interaction data identifiers to request the appropriate data from simulator application 660, and the list of interaction data identifiers can be in the form of a processing options data object list (PDOL). The interaction data requested by the simulated user device 601 for the interaction may include terminal interaction qualifiers (TIQ) or, for transactions, terminal transaction qualifiers (TTQ), authorized amount, other amount, terminal country code, terminal verification results, transaction currency code, transaction data, transaction type, and/or an unpredictable number. The terminal transaction data request 608 may also include other data such as FCI issuer discretionary data, application program identifier, and language preference.

After receiving the terminal interaction data request 608, simulator application 660 may send, to the simulated user device 601, the terminal interaction data 610 requested by the simulator application 660. In some embodiments, the terminal interaction data 610 may be sent in the form of a get processing options (GPO) command, and may include the requested terminal interaction data in a processing options data object list (PDOL). In some embodiments, the terminal interaction data 610 (e.g., terminal transaction qualifiers (TTQ)) may include an interaction type indicator. In some embodiments, the terminal interaction data 610 (e.g., terminal transaction qualifiers (TTQ)) may also include a consumer verification method (CVM) requirement indicator to indicate whether a CVM is required by simulator application 660 for the interaction, and also one or more CVM type indicators indicating the types of CVM supported by simulator application 660. Examples of CVMs that may be supported by simulator application 660 can include online PIN, signature, and/or consumer device CVM (CDCVM).

Once the simulated user device 601 receives terminal interaction data 610, the simulated user device 601 may increment its Application Interaction Counter (AIC) or Application Transaction Counter (ATC), generate dynamic interaction processing information using at least some of the received terminal interaction data 610, and send a set of interaction processing information 612 including the generated dynamic interaction processing information to simulator application 660. In some embodiments, the interaction processing information 612 can be sent in the form of a GPO response. In some embodiments, the interaction processing information 612 may include one or more application file locators (AFLs) that can be used as file address(es) by simulator application 660 to read account data stored on simulated user device 601, and an application interchange profile (AIP) that can be used to indicate the capabilities of the simulated user device 601.

The interaction processing information 612 may include an interaction cryptogram dynamically generated using the LUK, track-2 equivalent data, and addition data such as issuer application data (IAD), form factor indicator (FFI), card interaction qualifiers (CIQ) or card transaction qualifiers (CTQ), cryptogram information data (CID), the updated AIC or ATC, and/or an application PAN sequence number (PSN). In some embodiments, the issuer application data (IAD) may include a length indicator indicating the length of the IAD, cryptogram version number (CVN) indicating the version of the interaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK.

The card verification results (CVR) may include information about the CVM verifying entity and the CVM verified type for the interaction. The CVM verifying entity is used to indicate which entity is performing the verification of the CVM for the interaction. The verification entity may be the simulator application 660, a co-residing secure application, a trusted execution environment application, a remote server (e.g., the cloud), or the mobile operating system. The CVM verified type is used to indicate the CVM method used for the interaction. The CVM method may be a passcode, biometric (e.g., fingerprint), pattern lock (e.g., for a screen lock), signature, or online PIN. In some embodiments, if the terminal interaction data 610 received from simulator application 660 indicates that the CVM supported by simulator application 660 is an online PIN or a signature, the CVM verifying entity in the CVR can be set to the simulator application 660 to indicate that simulator application 660 is the verifying entity, and the CVM verified type can be set accordingly (e.g., online PIN or signature).

If the terminal interaction data 610 received from simulator application 660 indicates that the CVM supported by simulator application 660 is a CDCVM, the CVM verifying entity and the CVM verified type can be set according to the configuration parameters of the account. In some embodiments, a CDCVM performed indicator can be included in the CIQ or CTQ to indicate whether the CVM verifying entity has successfully verified the user using the CDCVM indicated by the CVM verified type.

If the terminal interaction data 610 received from simulator application 660 indicates that a CVM is not required, the CVM verifying entity and the CVM verified type can be set to indicate that no CVM was verified. In some embodiments, the CVR may include additional data such as a threshold indicator that indicates whether one or more limited-use thresholds associated with the LUK has been exceeded.

The form factor indicator (FFI) may include information about simulated user device 601, such as a form factor indicator version number indicating the version of the form factor indicator being used, a consumer payment device form factor indicator indicating the device type of simulated user device 601, and consumer payment device features indicators indicating what payment features are supported by simulated user device 601. The consumer payment device form factor may indicate that simulated user device 601 is a simulation of a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether simulated user device 601 is capable of using a passcode (can be separate from a PIN that is used during transactions), has a signature panel, has a hologram, has support for card verification values (e.g., CVV2), capable of two-way messaging to exchange identifying information between the issuer and the user, and/or has support for using cloud-based credentials (e.g., LUK, token, etc.). The form factor indicator (FFI) may also include an interaction technology indicator indicating that simulated user device 601 supports contactless interactions (e.g., NFC).

It should be understood that in some embodiments, the interaction processing information 612 provided by the simulated user device 601 to simulator application 660 may include some or all of the information describe above, and in some embodiments, may include additional information not specifically described.

After simulator application 660 receives the interaction processing information 612, simulator application 660 may send an account data request 614 to the simulated user device 601 to read additional account data that may be stored on simulated user device 601. In some embodiments, the account data request 614 may be in the form of a read record command, and may include an application file locator (AFL) indicating the location of the account data that simulated user device 660 is attempting to read. The AFL included in the account data request 614 may correspond to an AFL in the interaction processing information 612 that was provided to simulator application 660 from simulated user device 601.

In response to receiving the account data request 614 from simulator application 660, simulated user device 601 may send the account data 616 stored at the location indicated by the AFL to simulator application 660. In some embodiments, the account data 616 may be sent in the form of a read record response. The account data 616 may include, for example, application usage control that indicates the issuer's restrictions on the usage and services allowed for the application, the cardholder's name, customer exclusive data, issuer country code, token requester ID (e.g., if a token is used), and/or other account related data that is accessible at the AFL location.

It should be understood that in some embodiments, the account data 616 being sent from simulated user device 601 to simulator application 660 may include some or all of the information describe above, and in some embodiments, may include additional information not specifically described.

In some embodiments, there can be more than one pair of account data request 614 and account data 616 communication exchange between simulator application 660 and simulated user device 601, for example, if additional account related data stored is needed by simulator application 660 to complete the interaction. Once simulator application 660 has received the requisite data from the interaction processing information 612 and/or one or more account data 616 transmissions, some or all of the data elements in the interaction processing information 612 and/or one or more account data 616 transmissions can be used by simulator application 660 to generate an interaction authorization request message to request authorization of the interaction from the issuer. For example, in some embodiments, the interaction authorization request message may include at least the track-2 equivalent data and the interaction cryptogram generated with the LUK, and the interaction can be authorized based on at least verifying that the interaction cryptogram was generated correctly and that the LUK used in generation of the interaction cryptogram has not exhausted the LUK's set of one or more limited use thresholds.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
    retrieving, by a simulator application on a mobile device, a first data record from a resource file, the resource file storing a plurality of data records associated with a plurality of user devices, the plurality of data records including at least the first data record and a second data record;
    generating, by the simulator application, a first interaction payload including the first data record;
    providing, by the simulator application, the first interaction payload to a first contactless acceptance application stored on the mobile device, wherein the first contactless acceptance application causes the mobile device to transmit a first interaction message comprising the first interaction payload to a first service provider computer, wherein the first service provider computer processes a first test interaction using the first data record included in the first interaction payload;
    retrieving, by the simulator application, the second data record from the resource file;
    generating, by the simulator application, a second interaction payload including the second data record; and
    providing, by the simulator application, the second interaction payload to the first contactless acceptance application, wherein the first contactless acceptance application causes the mobile device to transmit a second interaction message comprising the second interaction payload to the first service provider computer, wherein the first service provider computer processes a second test interaction using the second data record included in the second interaction payload.

2. The method of claim 1, further comprising:
    loading, into the mobile device, the simulator application.

3. The method of claim 1, wherein a time between generating the first interaction payload and the second interaction payload is less than one minute or a second.

4. The method of claim 1, further comprising:
    receiving, by the mobile device, a first response message, wherein the first response message indicates whether the first test interaction was processed successfully; and
    receiving, by the mobile device, a second response message, wherein the second response message indicates whether the second test interaction was processed successfully.

5. The method of claim 1, further comprising:
    retrieving, by the simulator application, one or more other data records from the resource file;
    generating, by the simulator application, one or more other interaction payloads including the one or more other data records; and
    providing, by the simulator application, the one or more other interaction payloads to the first contactless acceptance application, wherein the first contactless acceptance application causes the mobile device to transmit one or more other interaction messages comprising the one or more other interaction payloads to the first service provider computer, wherein the first service provider computer processes one or more other test interactions using the first data record.

6. The method of claim 1, wherein retrieving the first data record from the resource file comprises simulating a first contactless data exchange with a first simulated user device, a first result of the first contactless data exchange comprising the first data record, and wherein retrieving the second data record from the resource file comprises simulating a second contactless data exchange with a second simulated user device, a second result of the second contactless data exchange comprising the second data record.

7. The method of claim 1, wherein generating the first interaction payload comprises encrypting the first data record.

8. The method of claim 7, wherein the first data record is encrypted using a session key, and wherein the method further comprises: deriving, by the simulator application, the session key from a key store.

9. The method of claim 1, further comprising:
receiving, by the simulator application, from a second contactless acceptance application, a third request for a third interaction payload;
retrieving, by the simulator application, a third data record from the resource file;
generating, by the simulator application, a third interaction payload including the third data record; and
providing, by the simulator application, the third interaction payload to the second contactless acceptance application, wherein the second contactless acceptance application causes the mobile device to transmit a third interaction message comprising the third interaction payload to a second service provider computer, wherein the second service provider computer processes a third test interaction with the third data record included in the third interaction payload.

10. The method of claim 9, wherein the mobile device is a mobile phone.

11. The method of claim 1, further comprising, prior to retrieving the first data record from the resource file:
receiving, by the simulator application, from the first contactless acceptance application, a first request for the first interaction payload.

12. The method of claim 11, wherein the first request for the first interaction payload comprises first identification data, and wherein the method further comprises:
identifying, by the simulator application, the first data record stored in the resource file using the first identification data.

13. The method of claim 12, wherein the first data record is associated with a first data index, and wherein the first identification data comprises the first data index.

14. The method of claim 12, wherein the first data record is associated with a first user device identifier, and wherein the first identification data comprises the first user device identifier.

15. A mobile device comprising:
a contactless element;
a processor; and
a computer readable medium coupled to the processor, the computer readable medium comprising instructions executable by the processor, to cause the mobile device to:
retrieve, using a simulator application, a first data record from a resource file, the resource file storing a plurality of data records associated with a plurality of user devices, the plurality of data records including at least the first data record and a second data record;
generate, using the simulator application, a first interaction payload including the first data record;
provide, using the simulator application, the first interaction payload to a first contactless acceptance application stored on the mobile device;
transmit, to a first service provider computer, using the first contactless acceptance application, a first interaction message comprising the first interaction payload, wherein the first service provider computer processes a first test interaction using the first data record in the first interaction payload;
retrieve, using the simulator application, the second data record from the resource file;
generate, using the simulator application, a second interaction payload including the second data record;
provide, using the simulator application, the second interaction payload to the first contactless acceptance application stored on the mobile device; and
transmit, to the first service provider computer, using the first contactless acceptance application, a second interaction message comprising the second interaction payload, wherein the first service provider computer processes a second test interaction using the second data record in the second interaction payload.

16. The mobile device of claim 15, wherein the instructions also cause the simulator application to retrieve the first data record from the resource file using a data record index, and wherein the instructions further cause the mobile device to increment the data record index.

17. The mobile device of claim 15, wherein the mobile device comprises a smartphone.

18. The mobile device of claim 15, wherein the plurality of data records comprise a plurality of APDU responses corresponding to the plurality of user devices, and wherein the first data record comprises a first APDU response.

19. The mobile device of claim 18, wherein generating the first interaction payload by encrypting the first data record comprises:
extracting one or more tags from the first APDU response; and
generating the first interaction payload by encrypting the one or more tags.

20. A system comprising:
a service provider computer; and
a mobile device comprising a contactless element, a processor coupled to the contactless element; and a computer readable medium coupled to the processor, the computer readable medium comprising instructions executable by the processor, to cause the mobile device to: retrieve, using a simulator application, a first data record from a resource file, the resource file storing a plurality of data records associated with a plurality of user devices, the plurality of data records including at least the first data record and a second data record, generate, using the simulator application, a first interaction payload including the first data record, provide, using the simulator application, the first interaction payload to a first contactless acceptance application stored on the mobile device, transmit, to a first service provider computer, using the first contactless acceptance application, a first interaction message comprising the first interaction payload, wherein the first service provider computer processes a first test interaction using the first data record in the first interaction payload, retrieve, using the simulator application, the second data record from the resource file, generate, using the simulator application, a second interaction payload including the second data record, provide, using the simulator application, the second interaction payload to the first contactless acceptance application stored on the mobile device; and transmit, to the first service provider computer, using the first contactless acceptance application, a second interaction message comprising the second interaction payload, wherein the first service provider computer processes a second test interaction using the second data record in the second interaction payload.

* * * * *